(12) United States Patent
Varshneya et al.

(10) Patent No.: US 9,162,426 B2
(45) Date of Patent: Oct. 20, 2015

(54) TRANSPARENT ARMOR SYSTEMS, METHODS FOR MAKING AND METHODS FOR USING

(75) Inventors: Arun Kumar Varshneya, Alfred, NY (US); Patrick Kenneth Kreski, Alfred Station, NY (US)

(73) Assignee: SAXON GLASS TECHNOLOGIES, INC., Alfred, NY (US)

( * ) Notice: Subject to any disclaimer, the term of this patent is extended or adjusted under 35 U.S.C. 154(b) by 647 days.

(21) Appl. No.: 13/400,029

(22) Filed: Feb. 17, 2012

(65) Prior Publication Data

US 2012/0198989 A1 Aug. 9, 2012

Related U.S. Application Data

(63) Continuation-in-part of application No. 11/468,470, filed on Aug. 30, 2006, now Pat. No. 8,304,078.

(60) Provisional application No. 61/443,838, filed on Feb. 17, 2011.

(51) Int. Cl.
| | |
|---|---|
| *F41H 5/04* | (2006.01) |
| *B32B 37/14* | (2006.01) |
| *B32B 17/10* | (2006.01) |
| *C03C 3/085* | (2006.01) |
| *C03C 3/087* | (2006.01) |

(Continued)

(52) U.S. Cl.
CPC ..... *B32B 17/10761* (2013.01); *B32B 17/10091* (2013.01); *C03C 3/085* (2013.01); *C03C 3/087* (2013.01); *C03C 3/112* (2013.01); *C03C 21/002* (2013.01); *F41H 5/0407* (2013.01); *B32B 2605/18* (2013.01); *Y10T 156/10* (2015.01)

(58) Field of Classification Search
None
See application file for complete search history.

(56) References Cited

U.S. PATENT DOCUMENTS

| | | | |
|---|---|---|---|
| 7,875,565 B1 | 1/2011 | Pinckney et al. | |
| 8,304,078 B2 | 11/2012 | Varshneya | |
| 2007/0060465 A1* | 3/2007 | Varshneya et al. | 501/68 |

(Continued)

FOREIGN PATENT DOCUMENTS

| | | | |
|---|---|---|---|
| WO | WO 03068501 A1 * | 8/2003 | |
| WO | WO 2006/135832 | 12/2006 | |
| WO | WO 2009042877 A2 * | 4/2009 | |

OTHER PUBLICATIONS

Kyocera, "Single Crystal Sapphire", no date, no author.*

(Continued)

*Primary Examiner* — David Sample
(74) *Attorney, Agent, or Firm* — Ditthavong & Steiner, P.C.

(57) ABSTRACT

There is a transparent armor system. The system comprises a transparent front region comprising a strike-face layer. The front region includes a mass of a type of material characterized by having sufficient energy absorption capacity and energy dissipation properties to reduce radial tensile stresses and hoop tensile stresses caused by an impact at the strike face to a set reduced level. The impact has impact energy caused by an impact projectile having a mass hitting the strike-face layer. The system further comprises a transparent back region comprising a potassium-sodium exchanged glass characterized by having a surface compression of at least about 50,000 psi and a compression case depth of at least about 200 microns. The potassium-sodium exchanged glass is present in one of a layer and a plurality of layers in the back region. There are also associated methods of making and methods of using.

11 Claims, 2 Drawing Sheets

(51) Int. Cl.
*C03C 3/112* (2006.01)
*C03C 21/00* (2006.01)

(56) References Cited

U.S. PATENT DOCUMENTS

| | | | |
|---|---|---|---|
| 2007/0068375 A1* | 3/2007 | Jones et al. | 89/36.02 |
| 2007/0068376 A1* | 3/2007 | Jones et al. | 89/36.02 |
| 2009/0100872 A1 | 4/2009 | Hawtof et al. | |
| 2009/0136702 A1 | 5/2009 | Gu | |
| 2009/0217813 A1 | 9/2009 | Carberry et al. | |
| 2009/0263651 A1 | 10/2009 | Cook | |
| 2010/0132540 A1* | 6/2010 | Mandelartz et al. | 89/36.02 |
| 2010/0275767 A1 | 11/2010 | Pinkney et al. | |
| 2011/0088541 A1 | 4/2011 | Pinkney et al. | |
| 2012/0094084 A1 | 4/2012 | Fisher et al. | |
| 2012/0174761 A1* | 7/2012 | Dabich et al. | 89/36.02 |

OTHER PUBLICATIONS

Schott, "ZERODUR(R) Zero Expansion Glass Ceramic," Jul. 2011, No Author.*
Valley Designs, "Soda Lime Flat Float Glass" No author, no date.*
"ROBAX Glass—Hear Resistant Glass Ceramic," No Date, no author.*
Rioux et al., "Transparent Armor", Advanced Materials & Processes, Oct. 2007, pp. 31-33.
Strassburger, E., "Ballistic Testing of Transparent Armour Ceramics", J. European Ceramic Society, published Jun. 9, 2008, vol. 29 (2009), pp. 267-273.

\* cited by examiner

TRANSPARENT ARMOR SYSTEMS, METHODS FOR MAKING AND METHODS FOR USING

CLAIM FOR PRIORITY

This application claims priority to U.S. Provisional Application No. 61/443,838, entitled "Transparent Armor Laminates with Strengthened Glass" by Varshneya, et al. filed on Feb. 17, 2011, and, as a Continuation-in-Part, to U.S. Utility application Ser. No. 11/468,470, entitled "Chemically Strengthened Lithium Aluminosilicate Glass Having High Strength Effective to Resist Fracture upon Flexing from Impact of High Velocity Projectiles" by Varshneya, et al. filed on Aug. 30, 2006, now U.S. Pat. No. 8,304,078 both of which are incorporated by reference in their entirety.

STATEMENT REGARDING FEDERALLY-SPONSORED RESEARCH OR DEVELOPMENT

Not applicable.

BACKGROUND OF THE INVENTION

Transparent armor is a sub-set of ballistic armor. Ballistic armor is generally designed to provide protection of personnel and equipment from ballistic projectiles, explosive ordnance, and forces and objects from detonation of improvised explosive devices (collectively hereinafter "projectiles"). One purpose for ballistic armor, including transparent armor, is to provide a means of disbursing the kinetic energy of projectiles to prevent them from reaching their target. Although this may be accomplished by interposing a large mass of any of a number of different materials between the target and the incoming projectile, experience has shown that a much more efficient means of energy disbursement is provided by suitably engineered ballistic armor structures wherein layers of different materials act to disrupt and disperse the energy of an incoming projectile. Such structures strive to maximize the amount of material which may be acted upon to absorb and disburse the energy of the projectile, while at the same time breaking or deforming the projectile and distributing these resulting fragments into a wider area. Such structures further strive to minimize the total amount of materials required for the protection of a specific area.

Ballistic armor structures generally contain one or more layers of material engineered to spread the force of the impact by deforming, deflecting, or fragmenting the ballistic projectile while the ballistic armor itself may undergo deformation or localized fragmentation. The deformation and localized fragmentation processes of the ballistic armor structure absorb a large portion of energy from the projectile while simultaneously spreading the impacted area to involve more material in successive layers. Both hardness and toughness of the ballistic armor structure are required for these functions.

In the field of ballistic armor structures, the initial layer of material used to disrupt the incoming ballistic projectile is often referred to as the "strike face", or alternatively, the "hard face". The strike face is typically a layer of relatively hard and tough material designed to deform, and in some cases fragment or blunt, to absorb at least some of the energy of the incoming projectile, thereby distributing the projectile's energy. Following the strike face, there are commonly other layers specifically designed to absorb the remaining energy of the impacting material and pieces of the previous strike face. These layers are, often referred to as the "backing" or "back layers".

The process of energy absorption and disbursement of the incoming projectile by the ballistic armor structure is generally intended to result in deformation, displacement and/or localized fracture of the strike face, and deformation and/or displacement of the baking, but without penetration through the ballistic armor structure by any fragments of the ballistic projectile. Selection of materials for these distinct functions and attention to construction and coupling of the various layers is often used to optimize performance of the ballistic armor structure for an intended use.

Great advances have been made in selection of materials for optimizing the performance of ballistic armor structures. Use of high-strength, hard, and in some cases "tough" ceramics like aluminum oxide, boron carbide, titanium diboride and silicon carbide for the strike face; and rigid or soft laminates of fibrous materials such as fiberglass, aramid, or polyethylene fiber for the backing have greatly reduced the mass and bulk of protective structures. These advances, unfortunately, have not been readily applicable to those areas where a transparent protective structure is required. The high-strength, hard ceramics and the laminated fibrous backing materials are not transparent; and so none are adaptable to transparent protective structures.

The need for transparency in transparent armor substantially limits possible choices of materials for fabrication of the strike face of transparent protective systems, especially if aerial density is a factor. Although recent advances have been demonstrated in use of crystalline or highly processed materials such as, hot-pressed spinel, aluminum oxynitride (ALON) ceramics, or melt grown aluminum oxide (sapphire) crystal sheets for the strike face, manufacturing cost and other limitations would seem to restrict their use in many applications, or to limit their utilization to serving as just a strike face layer in an overall transparent armor system.

One common material used for fabrication of the strike face in transparent armor is borosilicate float glass or soda lime glass, a material which is neither very hard, nor very tough, and which has a relatively high specific density. This results in the need to greatly increase the aerial mass and bulk of transparent armors in order to preserve effectiveness against projectiles. Such increase in aerial mass and bulk ultimately results in a conventional transparent armor having an increased weight per level of protection provided by the transparent armor.

A similar situation exists in regard to the materials used in the backing layers. The fibrous laminates traditionally used in the backing layers of ballistic armor structures are not transparent. Traditional backing and fragment catching layers for transparent armor are often un-reinforced sheets of polyacrylic or polycarbonate polymer, although some advances have been made in the use of optimized copolymer compositions for these layers. Thus, for most transparent armor applications, the common solution is a strike face of multiple layers of borosilicate float glass with a backup layer or layers of a polymer sheet to catch fragments, bound together with a conventional transparent adhesive.

Another approach has been to utilize a strike face layer of one of the harder materials, such as a spinel, an ALON ceramic or a sapphire and to use borosilicate float glass or soda lime glass in the backing layers. However, even this approach has limitations when the transparent armor system is challenged by a large and/or high velocity projectile or by multiple hits from multiple projectiles.

When an ordinary glass plate, such as those used in the previously-developed transparent armor systems described above, is impacted by a high velocity projectile, fractures may be created at both the impacted surface as well as the back surface. The front surface cracks are Hertzian in origin where the response of the material varies with the extent of penetration. During penetration, the impacted material is compressed as well as sheared aside. At the edge of the plastically densified region, the (radial) "bearing stress" often creates a ring crack which commonly propagates into a fracture cone through the thickness. At greater indentation, the plastic shearing often generates hoop stresses which, in turn, can give rise to radial cracks ("Palmqvist cracks") originating from the edge of the sheared zone on the top surface. Median cracks commonly appear at the lower edges of the densified region. During elastic recovery after projectile impact, the Palmqvist cracks and the median cracks commonly meet up to produce "half-penny" cracks. Additionally, lateral cracks at the lower edge of the densified region are often generated. When impacted by a blunt projectile, material under the impact in a transparent armor system may densify without much shearing. The traveling stress wave on the surface ("Rayleigh wave") often generates high radial stresses which progressively produce concentric cracks.

The compression and shear waves that travel in-line through the glass in the back layers of the transparent armor reflect from the back surface to become tensile waves. These, then, produce tensile stresses which are the highest at the back surface of the last non-polymer ply in the transparent armor. The glass is bent outwards, often leading to large cracks generated at the back surface. In glass having a modulus of rupture (MOR) of 35 MPa, as with glasses in previously developed transparent armor system, it is no surprise that, in the baseline configurations made using seven plys of 9.5 mm soda lime silicate (SLS) float glass (e.g., STARFIRE® by PPG), nearly all of the back glass plys usually show extensive cracking which, in turn, greatly reduces visibility.

A substitute material to SLS could potentially be of great benefit in terms of maintaining integrity of the back plys to maintain transparency in a transparent armor system challenged by a large and/or high velocity projectile or by multiple hits from multiple projectiles. In addition, it would be useful to provide a transparent armor system that reduces areal density (AD). Such a transparent armor system would be particularly useful if it could be achieved without merely resorting to utilizing only the costly harder materials, such as spinel, ALON ceramic or sapphire.

Given the foregoing, what is needed are transparent armor systems with improved properties to preserve transparency in a transparent armor system challenged by a large and/or high velocity projectile or by multiple hits from multiple projectiles, without the above-identified limitations of previously-developed transparent armor systems.

BRIEF SUMMARY OF THE INVENTION

This summary is provided to introduce a selection of concepts. These concepts are further described below in the Detailed Description. This summary is not intended to identify key features or essential features of the claimed subject matter. Also, this summary is not intended as an aid in determining the scope of the claimed subject matter.

The present invention meets the above-identified needs by providing a transparent armor system, such as a laminate, having a transparent front region and a transparent back region. The front region comprises a strike-face layer and sufficient energy absorption capacity a mass of a type of material characterized by having sufficient energy absorption capacity and energy dissipation properties to reduce radial tensile stresses and hoop tensile stresses caused by an impact to a reduced level of at least about 30,000 psi. The impact has an impact energy of at least about 1,000 joules caused by an impact projectile having a mass of at least about 5 grams hitting the strike-face layer along a normal vector. The system also comprises a transparent back region comprising a K—Na exchanged glass characterized by having a surface compression of at least about 50,000 psi and a compression case depth of at least about 200 microns. The K—Na exchanged glass may be present in one of a layer and a plurality of layers in the back region.

According to a second principle of the invention, there is method for making a transparent armor system. The method comprises fabricating a plurality of layers through bonding them together to form a transparent front region and a transparent back region. The transparent front region comprises a strike-face layer that may be present in one of a layer and a plurality of layers in the front region. The front region comprises a mass of a type of material characterized by having sufficient energy absorption capacity and energy dissipation properties to reduce radial tensile stresses and hoop tensile stresses caused by an impact to a reduced level of at least about 30,000 psi. The impact has an impact energy of at least about 1,000 joules caused by an impact projectile having a mass of at least about 5 grams hitting the strike-face layer along a normal vector. The system also comprises a transparent back region comprising a K—Na exchanged glass characterized by having a surface compression of at least about 50,000 psi and a compression case depth of at least about 200 microns. The K—Na exchanged glass may be present in one of a layer and a plurality of layers in the back region.

According to a third principle of the invention, there is method for using a transparent armor system. The method comprises installing the system as a component in an article of manufacture. The system comprises a transparent front region comprising a strike-face layer that may be present in one of a layer and a plurality of layers in the front region. The front region comprises a mass of a type of material characterized by having sufficient energy absorption capacity and energy dissipation properties to reduce radial tensile stresses and hoop tensile stresses caused by an impact to a reduced level of at least about 30,000 psi. The impact has an impact energy of at least about 1,000 joules caused by an impact projectile having a mass of at least about 5 grams hitting the strike-face layer along a normal Vector. The system also comprises a transparent back region comprising a K—Na exchanged glass characterized by having a surface compression of at least about 50,000 psi and a compression case depth of at least about 200 microns. The K—Na exchanged glass may be present in one of a layer and a plurality of layers in the back region.

The above summary is not intended to describe each embodiment or every implementation of the present invention. Further features, their nature and various advantages will be more apparent from the accompanying drawings and the following detailed description of the examples and embodiments.

BRIEF DESCRIPTION OF THE DRAWINGS

The features and advantages of the present invention become more apparent from the detailed description set forth below when taken in conjunction with the drawings in which like reference numbers indicate identical or functionally similar elements. Additionally, the left-most digit of a reference number identifies the drawing in which the reference number first appears.

In addition, it should be understood that the drawings in the figures which highlight the aspects, methodology, functionality and advantages of the present invention, are presented for example purposes only. The present invention is sufficiently flexible, such that it may be implemented in ways other than shown in the accompanying figures.

DETAILED DESCRIPTION

Figure 3:
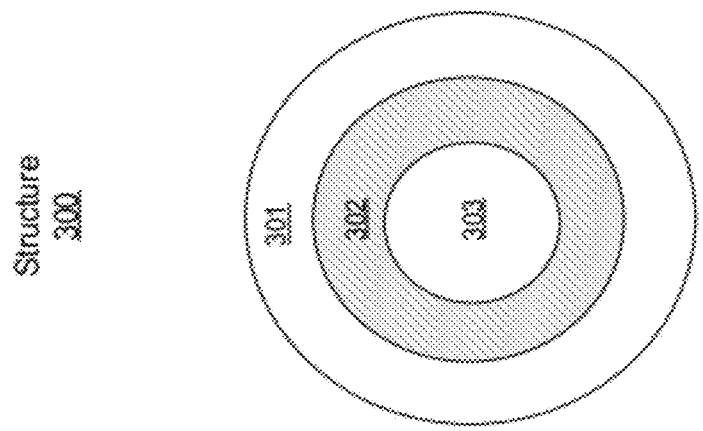
FIG. 3 is a cross-sectional view of a transparent armor system in a curved structure with a layer of lithium aluminosilicate glass in a back region, according to an example.

The present invention is useful for certain reinforcing structure applications, and has been found to be particularly advantageous as transparent armor for vehicles used in environments exposed to conflict. While the present invention is not necessarily limited to such applications, various aspects of the invention are appreciated through a discussion of various examples using this context.

For simplicity and illustrative purposes, the present invention is described by referring mainly to embodiments, principles and examples thereof. In the following description, numerous specific details are set forth in order to provide a thorough understanding of the examples. It is readily apparent however, that the embodiments may be practiced without limitation to these specific details. In other instances, some embodiments have not been described in detail so as not to unnecessarily obscure the description. Furthermore, different embodiments are described below. The embodiments may be used or performed together in different combinations.

The operation and effects of certain embodiments can be more fully appreciated from a series of examples, as described below. The embodiments on which these examples are based are representative only. The selection of those embodiments to illustrate the principles of the invention does not indicate that materials, components, reactants, conditions, techniques, configurations and designs, etc. which are not described in the examples are not suitable for use, or that subject matter not described in the examples is excluded from the scope of the appended claims and their equivalents. The significance of the examples can be better understood by comparing the results obtained therefrom with potential results which can be obtained from tests or trials that may be or may have been designed to serve as controlled experiments and provide a basis for comparison.

As used herein, the terms "based on", "comprises", "comprising", "includes", "including", "has", "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). Also, use of the "a" or "an" is employed to describe elements and components. This is done merely for convenience and to give a general sense of the description. This description should be read to include one or at least one and the singular also includes the plural unless it is obvious that it is meant otherwise.

The meaning of abbreviations and certain terms used herein, is as follows; "Å" means angstrom(s), "nm" means nanometer(s), "μm" means micrometer(s), "g" means gram(s); "mg" means milligram(s), "μg" means microgram(s), "L" means liter(s), "mL" means milliliter(s), "cc" means cubic centimeter(s), "g/cm$^3$" means grams per cubic centimeters, "mol" means mole(s), "mmol" means millimole(s), "wt. %" means percent by weight, "psi" means pounds per square inch, "pascals" are a measure of force per-area meaning 1 Pa equals 1 N/m$^2$, "GPa" means kiloNewtons per square millimeter and may also be expressed as pounds force per square inch (conversion 1 GPa equals roughly 145,000 psi), "Knoop hardness" means load/impression area and is $P/C_pL^2$ where P is the load, L is the length of indentation along the long axis, and $C_p$ is a correction factor related to the shape of an indenter, ideally 0.070279, and may be obtained in GPa, "Young's modulus" is a measure, of the elastic resistance of a body and can be expressed in units of psi or GPa, "Toughness" is a measure of energy absorbing capability and can be expressed in units of MPa·m$^{1/2}$, "Modulus of Rupture (MOR)" is the failure strength during bending and is expressed in units of psi, or MPa, "aerial density" is a measure of mass per area and may be expressed as kilograms per square meter or pounds per square foot, "annealing point" is the temperature at which a glass has a viscosity of $10^{13}$ poise; at this viscosity, stresses are relieved in about 15 minutes. The term "case depth" is a distance measured from a surface of a glass article to the nearest position in the interior of the article at which there is zero stress in the glass article.

Transparent armor systems, according to the principles of the invention, comprise a backing region that is a layer, a ply or other article of a chemically strengthened lithium aluminosilicate glass as described in U.S. Utility application Ser. No. 11/468,470, entitled "Chemically Strengthened Lithium Aluminosilicate Glass Having High Strength Effective To Resist Fracture Upon Flexing From Impact of High Velocity Projectiles" by Varshneya, et al. filed on Aug. 30, 2006 incorporated by reference above.

The chemically strengthened K—Na exchanged lithium aluminosilicate glass comprises a composition that provides the glass with a high strain point, which achieves high surface compression deep compression case depth and high strength effective to resist fracture upon flexing from impact of high velocity projectiles. In an embodiment, the K—Na exchanged glass may be characterized by a surface compression of at least 100,000 psi and a compression case depth of at least 600, microns and, in an example, at least 1000 microns. In another embodiment, the K—Na exchanged glass can exhibit strength at 50 microns below a surface of the glass that is at least 30,000 psi. As the compression level is 30,000 psi, a tensile stress higher than 30,000 psi may be needed to cause fracture.

The chemically strengthened K—Na exchanged glass may be made by a process using a molten salt dual ion-exchange bath having a mixture of sodium and potassium ions for exchange with lithium ions present in a prior glass that may be a commercially available flat glass. Prior glass that is suitable for being treated to effect high strength and deep compression case depths has a composition that provides it with an annealing point of about 580° C. or higher. This allows chemical strengthening to be carried out using a molten mixed salt bath having a temperature of about 450° C. or higher and, preferably, about 475° C. or higher. Although the prior glass can be preheated, neither the salt bath temperature nor the glass temperature should be close to the glass annealing point temperature or exceed a temperature that is about 25° C. less than the glass annealing point temperature. The prior glass generally has a high glass transition temperature ($T_g$) of, for example, The prior glass generally has a high glass transition temperature (Tg) of, for example, about 620-630° C. In another example, about 620-680° C. In yet another example, about 680-700° C. In yet another example, about 700-750° C. A prior glass for making the K-NA exchanged glass may have a glass transition temperature (Tg) of about 610, 620, 630, 640, 650, 660, 670, 680, 690, 700, 710, 720, 730, 740, and 750° C.

A higher concentration of potassium ions to sodium ions may be used in the dual ion-exchange molten salt bath. A ratio of moles of sodium to moles of potassium in the salt bath may range from 1:10 to 1:2 and may be about 1:2.1, 1:2.2, 1:2.3, 1:2.5, 1:3, 1:4, 1:5, 1:6, 1:8, 1:10, 1:15, 1:20 and even higher in the ratio of sodium to potassium. The amount of sodium salt in the total salt of the molten mixed salt bath is generally well below 50 mol. %. An exemplary composition of the salt bath that is advantageously used in making the K—Na exchanged glass is about 20 mol % sodium salt, about 80 mol % potassium salt and unavoidable impurities.

Examples of prior glass that may be chemically strengthened according to the K—Na exchange process may have a composition comprising $Li_2O$ in an amount ranging from about 3 to 9 wt. %, $Na_2O$ and/or $K_2O$ in an amount of less than about 3.5 wt. %, and $Al_2O_3$ in an amount ranging from about 7 to 30 wt. %. In an example, $Na_2O$ and/or $K_2O$ in the glass may range from about 0 to 3 wt. %, and $Al_2O_3$ may range from about 18-28 wt. %. In another example, the glass may have a composition comprising or consisting essentially of $Li_2O$ in an amount ranging from 3 to 9 wt. %, $Na_2O$ and/or $K_2O$ in an amount less than about 3.5 wt. %, $Al_2O_3$ in an amount ranging from 7 to 30 wt. %, up to about 4 wt. % each of $ZrO_2$, $TiO_2$, MgO, ZnO and similar constituents totaling up to about 10 wt. %, with the balance being $SiO_2$ and impurities. Commercially available sources are well known in the art and described in Varshneya et al, incorporated by reference above.

The process for treating the prior glass involves utilizing a molten salt bath having a mix of both sodium and potassium ions for exchanging both ions with lithium ions in the prior glass. Both exchanges (sodium for lithium deep inside the glass and potassium for lithium in the surface) may occur concurrently. In conventional salt baths having high sodium salt concentration, there is little potassium-lithium exchange. Also, elevated temperatures of the bath of at least about 450° C. and higher are used to increase the mobility of potassium ions. This higher temperature for the potassium exchange calls for the prior glass to have a sufficiently high annealing point such that viscous relaxation of stresses does not occur significantly. Therefore, higher amounts of potassium may be utilized in the mixed bath to encourage potassium for lithium exchange in the surface. This results in an ion exchanged glass having high strength adapted for use under the extreme condition of resisting fracture upon flexing from impact of high velocity projectiles.

The chemical strengthened K—Na exchanged glass, according to different examples, may have a surface compression of 25,000 psi, 50,000 psi, 75,000 psi, 100,000 psi, 150,000 psi, and higher. In other examples, it may have a compression case depth of at least 100 microns, 200 microns, 400 microns, 600 microns, 800 microns, 1,000 microns and higher. In another embodiment, the K—Na exchanged glass can exhibit strength at 50 microns below a surface of the glass that is 10,000 psi, 20,000 psi, 30,000 psi, 40,000 psi, 50,000 psi, 100,000 psi and higher.

The K—Na exchanged glass may be incorporated into the back region of a transparent armor system, such as a laminate, having a transparent front region and a transparent back region. The front region comprises a strike-face layer and sufficient energy absorption capacity and energy dissipation properties to reduce radial tensile stresses and hoop tensile stresses caused by an impact to a reduced level. The back region comprises the strengthened K—Na exchanged glass, which may be located in one layer or a plurality of layers of the back region of the transparent armor system.

Figure 1:
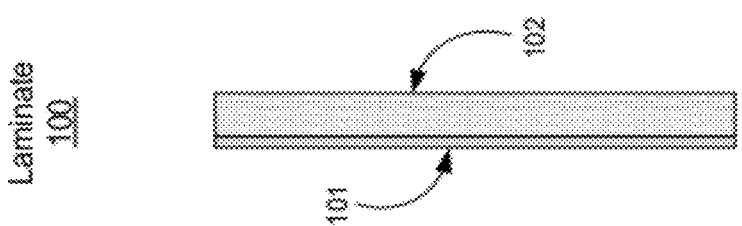
FIG. 1 is a cross-sectional view of a transparent armor system in a laminate with a single ply of lithium aluminosilicate glass in a back region, according to an example.

Referring to FIG. 1, depicted is a laminate 100, a transparent armor system according to the principles of the invention. Laminate 100 has a transparent front region incorporating a single layer 101 that may function as a strike face for the transparent armor system. Laminate 100 also has a transparent back region incorporating a single layer 102 comprising a potassium-sodium exchanged glass. Single layer 102 may be characterized as having a surface compression, such as 50,000 psi, and a compression case depth, such as 200 microns. Layer 101 in the front region may be any material that may be used as a strike face in a transparent armor system, such as a ply of spinel, glass ceramic, or soda-lime silicate glass. However, layer 101 is characterized as having a mass of a type of these materials having sufficient energy absorption capacity and energy dissipation properties to reduce radial tensile stresses and hoop tensile stresses caused by an impact to a reduced level.

In the event a spinel were utilized in layer 101, less mass would be required than if a soda-lime silicate glass were used for layer 101 to achieve a reduced level of the radial tensile stresses and hoop tensile stresses due to an impact of a projectile on the strike face. The reduced level of the radial tensile stresses and hoop tensile stresses is less than or about equivalent to the surface compression of the potassium-sodium exchanged glass in the layer 102. Accordingly, layer 102 does not crack when the transparent armor system is challenged and transparency is preserved.

The layers in a laminate of the foregoing materials may be bonded together using an adhesive material in any form, for example, a paste, gel or a sheet material. The adhesive material is placed between the layers of each stack. When the glass-ceramic, glass and spall layers are bonded together using a polymeric sheet material, bonding is achieved by application of heat and/or pressure. Adhesives in gel, paste or other fluid or semi-fluid form may be cured and bonding achieved by application of heat or radiation. The bonding materials, adhesive or polymer material, should match the refractive index of the other materials as closely as possible so as not to lessen optical performance. In preferred embodiments the adhesive and polymeric material should be transparent to infrared radiation.

Figure 2:
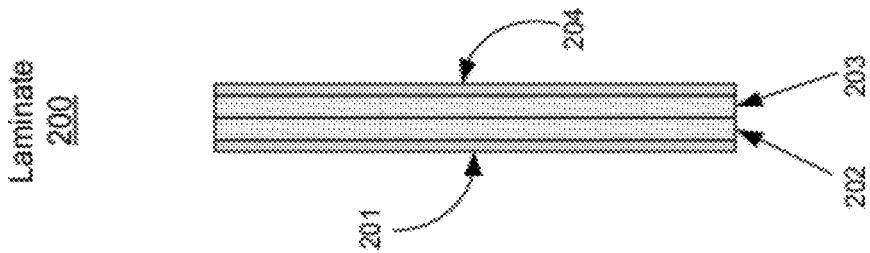
FIG. 2 is a cross-sectional view of a transparent armor system in a laminate with a multiple plys of lithium aluminosilicate glass in a back region, according to an example.

Referring to FIG. 2, depicted is a laminate 200, which is also a transparent armor system according to the principles of the invention. Laminate 200 also has a transparent front region incorporating a single layer 201 that may function as a strike face for the transparent armor system. Laminate 200 also has a transparent back region. The back region in laminate 200 incorporates three separate layers, layer 202, layer 203 and layer 204. According to an example, layer 202 and layer 203 are both potassium-sodium exchanged glasses that may be the same or different, and layer 204 is a transparent polymeric backing layer, such as a polycarbonate. In this example, layer 203 is the final glass layer of the back region. The layers in a laminate of the foregoing materials may be bonded together using an adhesive material in any form, for example, a paste, gel or a sheet material.

Referring to FIG. 3, depicted is a structure 300, which is also a transparent armor system according to the principles of the invention. Structure 300 is spherical. It has a transparent front region incorporating a single layer 301, the outer layer of the sphere. Layer 301 may function as a strike face for the transparent armor system. Structure 300 also has a transparent back region, a single layer 302. At the center of structure 300 is void space 303 for a payload and the like. The layers in a laminate of the foregoing materials may be bonded together using an adhesive material in any form, for example, a paste, gel or a sheet material.

EXAMPLES

The following examples demonstrate sample transparent armor systems and testing results relating to stress tests simulating a pure elastic impact by a 7.62×63 mm round (i.e., "7.62 round") overestimated to be 14.3 g mass and travel at 875 m/s velocity fired at point-blank range. A 7.62 round was selected for testing as the hardness, modulus of rupture (MOR), and toughness of clear unstrengthened glass and glass-ceramic, as alternative plys to the K—Na exchanged glass in a laminate are insufficient to develop an optimized laminate design that cannot be defeated or fractured by a 7.62 round. The baseline unstrengthened SLS glass would be penetrated much deeper than the transparent ceramic materials requiring thicker and multiple sheets. The relevant mechanical properties of the various commercially available clear materials for armor use are shown in TABLE I.

TABLE I

| Material | Density ($g/cm^3$) | Knoop Hardness (GPa) | Young's Modulus (GPa) | Toughness ($MPa./m^2$) | Modulus of Rupture, MOR (MPa) |
|---|---|---|---|---|---|
| Soda-lime silicate (SLS) Glass | 2.5 | 5.4 | 70 | 0.9 | 35 |
| K—Na exchanged glass | 2.43 | 7 at surface; 9.5 in impact | 70 | 2.6 at Surface | 800-1000 |
| Glass-ceramic | 2.6 | 6.9 | 122 | 2.4 | 100-150 |
| ALON | 3.67 | 13.8 | 315 | 2.4 | 228 |
| Spinel ($MgAl_2O_4$) | 3.58 | 12.1 | 277 | 1.72 | 241 |
| Sapphire | 4 | 22.5 | 345 | 2.5-4.5 | 350-690 |

The examples incorporating the materials listed in TABLE I are the four transparent armor laminates listed in TABLE II.

TABLE II

| Ex. No. | Laminate Structure Design | Total thickness | Areal Density |
|---|---|---|---|
| 1 | 4 mm spinel + 10 mm glass-ceramic + 8.3 mm K—Na exchanged glass + 8.3 mm K—Na exchanged glass + 4 mm polycarbonate. | 34.6 mm | 17.7 psf |
| 2 | 2 mm spinel + 13 mm glass-ceramic + 8.3 mm K—Na exchanged glass + 8.3 mm K—Na exchanged glass + 4 mm polycarbonate. | 35.6 mm | 17.8 psf |

TABLE II-continued

| Ex. No. | Laminate Structure Design | Total thickness | Areal Density |
|---|---|---|---|
| 3 | 16 mm glass-ceramic + 8.3 mm K—Na exchanged glass + 8.3 mm K—Na exchanged glass + 4 mm polycarbonate. | 36.6 mm | 17.8 psf |
| 4 | 16 mm SLS + 8.3 mm K—Na exchanged glass + 8.3 mm K—Na exchanged glass + 4 mm polycarbonate. | 36.6 mm | 17.8 psf |

All four examples incorporate K—Na exchanged glass as two back plys in a complex laminate configuration. In each example, the first sheet is the strike face while the last is a 4 mm polycarbonate spall-shield. For ease of computations, note that the aerial density (AD) of 4 mm polycarbonate, 10 mm soda lime silicate glass, 10 mm glass-ceramic, 8.3 mm K—Na exchanged glass and 4 mm spinel are 4.7 $kg/m^2$, 25 $kg/m^2$, 25 $kg/m^2$, 20.2 $kg/m^2$ and 14.3 $kg/m^2$ respectively (conversion factor 88 $kg/m^2$=18 psf). In configuring the examples above and conducting the simulations, the following considerations were included:

For a centrally applied elastic load, the deflection is inversely proportional to the cube of the thickness of the laminate assuming linear elasticity. Bending stresses are inversely proportional to the square of the thickness. Bending stresses are unaffected by the Young's modulus, however, the deflection is inversely proportional to the Young's modulus.

Extensive damage in transparent brittle bodies such as ceramics or glass occurs within about 50 μs after impact of a projectile. Cracking greatly reduces visibility with a high risk of perforation. An inelastic collision where the imparted energy is continuously absorbed and/or dissipated brings about lower damage with time after impact, and should be preferred. Important energy absorption mechanisms are: comminution, microcracking, macrocracking (e.g., "spider" cracks), and structural densification on atomic scale.

In addition to the release of heat and sound, the other mechanisms of energy dissipation are flexing in the direction of the impact ("outward") and transfer of energy to the housing.

Flexing and densification are clearly the more desirable. Comminution and microcracking may be acceptable since the visibility may still be maintained to a high level. Macrocracking is the least desirable.

Most network glasses possess low network yield strength which allows large structural densification absorbing energy, hence, glasses should be preferred.

The strike face of the laminate preferably has high hardness to induce erosion of the projectile and, hence, to minimize penetration.

Erosion of the projectile encourages comminution of the laminate by increasing the area of contact. Fine grain structure of a ceramic or glass-ceramic may also encourage comminution.

The back plys are preferably low Young's modulus, high MOR, low density sheets such as the K—Na exchanged glass to minimize weight and overall cost while achieving the required impact performance. The example laminates take advantage of the high MOR, low elastic modulus, high ability of an "open" glass network to densify, increased surface hardness, and a high (not measured, but anticipated) surface toughness of the K—Na exchanged chemically strengthened glass by employ it as intermediate and back plys.

The examples may be characterized as follows: Example 1 is a high-cost, high-performance configuration. The strike-face is a 4 mm spinel, followed by a high toughness glass-ceramic, followed by two layers of K—Na exchanged glass; all backed with 4 mm polycarbonate. If the front spinel ply reduces the velocity sufficiently, the glass-ceramic and the K—Na Exchanged glass plates should remain intact and the assembly immediately flexes back, ready for the next projectile. In example 2, the spinel thickness is reduced in an effort to reduce the cost. Examples 3 and 4 are low cost alternative at perhaps reduced performance level compared with examples 1 and 2.

Figure 4:
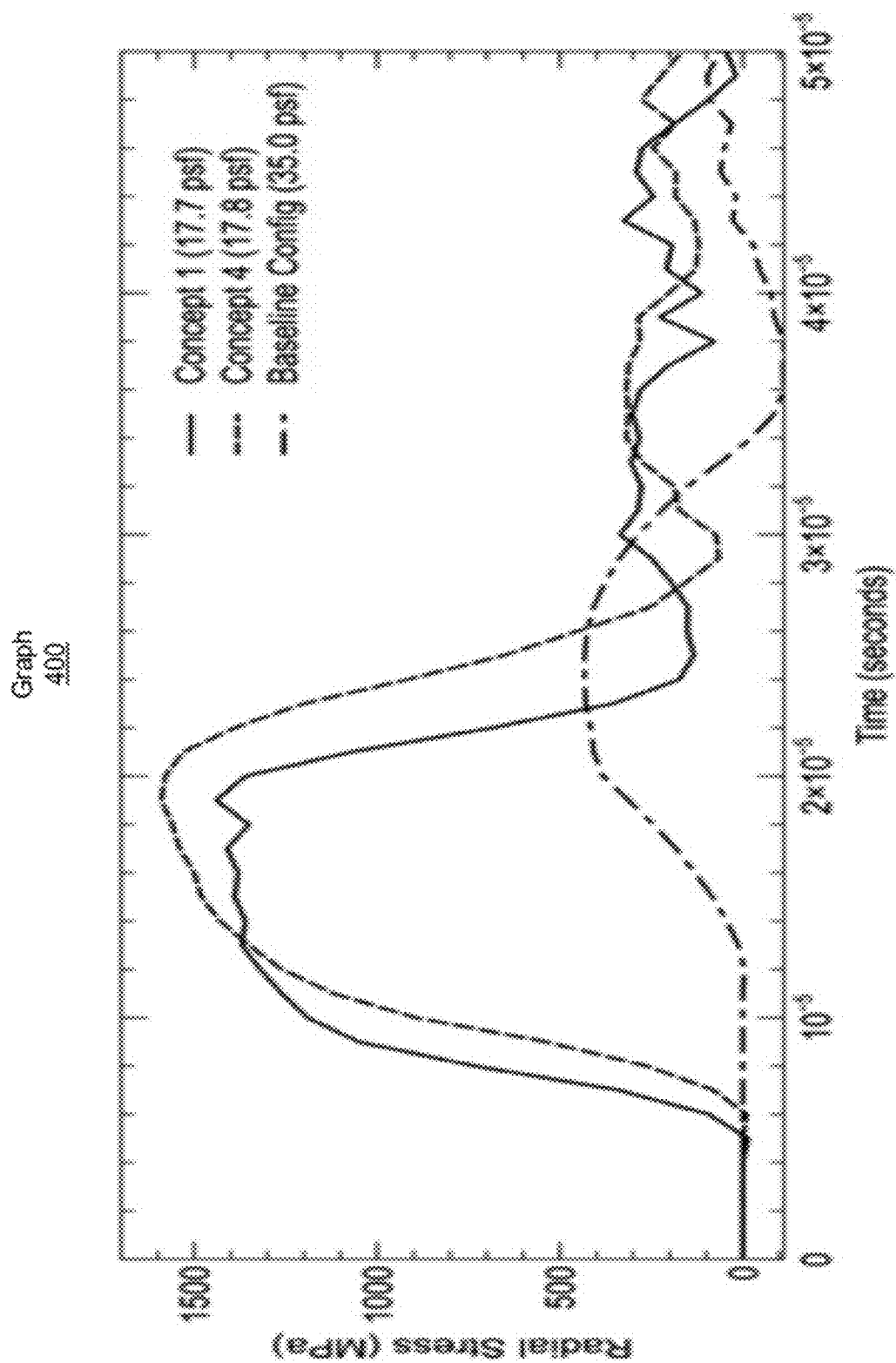
FIG. 4 is a graph of radial stress versus time at the back of the final ply in a transparent armor system, according to an example.

Referring to FIG. 4, depicted is a graph 400 showing the results of dynamic finite element simulations for examples 1 and examples 4, labeled respectively as "Concept 1" and "Concept 4" assuming pure elastic impact by a 7.62×63 mm round (overestimated to 14.3 g mass and 875 m/s velocity, fired at point-blank range) and assuming continuously connected layers. No fracture or energy absorption criteria have been incorporated; hence the simulations represent a worst-case scenario. Graph 400 is a radial stress versus time graph showing the progress of the radial stress over time through the back of the final glass ply in example 1 and example 4, labeled respectively as "Concepts 1" and "Concept 4", as well as the results for a baseline configuration of seven SLS glass plys plus a 4 mm polycarbonate spall-shield (total 70.5 mm thick).

As depicted in graph 400, although radial stress in the back glass ply of the baseline configuration is only about 500 MPa (at about 20 μs), it is well above the rated MOR for unstrengthened SLS glass. More than likely, the back SLS plys would fracture in the baseline configuration. Clearly, if the back plys in the baseline configuration were replaced by K—Na exchanged glass, the risk of fracture would be greatly lowered since the rated MOR of K—Na exchanged glass is 1 GPa.

Although the back ply of K—Na exchanged glass in Concepts (1) and (4) appears to have 1,400-1,600 MPa, the energy absorption and dissipation via projectile erosion and local comminution in the front sacrificial plys would reduce the radial stresses to well below 1 GPa, thus reducing fracture risk of the K—Na exchanged glass back plys.

These results demonstrate that a transparent armor system with K—Na exchanged glass back plys can survive challenges by a 7.62×63 mm round (overestimated to 14.3 g mass and 875 m/s velocity, fired at point-blank range) in a worst case scenario would maintain transparency through maintaining integrity in the K—Na exchanged glass back plys.

Transparent armor systems incorporating one or more K—Na exchanged glass back ply, according to the principles of the invention, provide a high strength, low mass, transparent armor systems with the ability to survive challenge by large high velocity projectiles while maintaining transparency. Such transparent armor systems may be utilized in a broad range of applications in providing high strength, low mass, transparent armor for personnel and equipment for many military and civilian security applications.

Although described specifically throughout the entirety of the disclosure, the representative examples have utility over a wide range of applications, and the above discussion is not intended and should not be construed to be limiting. The terms, descriptions and figures used herein are set forth by way of illustration only and are not meant as limitations. Those skilled in the art recognize that many variations are possible within the spirit and scope of the principles of the invention. While the examples have been described with reference to the figures, those skilled in the art are able to make various modifications to the described examples without departing from the scope of the following claims, and their equivalents.

Further, the purpose of the foregoing Abstract is to enable the U.S. Patent and Trademark Office and the public generally and especially the scientists, engineers and practitioners in the relevant art who are not familiar with patent or legal terms or phraseology, to determine quickly from a cursory inspection the nature and essence of this technical disclosure. The Abstract is not intended to be limiting as to the scope of the present invention in any way.

What is claimed is:

1. A system comprising:
a front region comprising at least one layer;
wherein the front region comprises a mass of material characterized by having sufficient energy absorption properties to reduce stresses caused by an impact
wherein the impact has an impact energy of an impact projectile hitting the front region; and a back region comprising at least one layer including a chemically strengthened glass characterized by having
a surface compression of at least 100,000 psi and
a compression case depth of at least 600 microns.

2. The system of claim 1, wherein the chemically strengthened glass is formed by chemically strengthening a prior glass having a composition including $Li_2O$ in an amount ranging from 3 to 9 weight % and $Al_2O_3$ in an amount ranging from 7 to 30 weight % and $SiO_2$, and an annealing point temperature of at least 580° C. prior to chemical strengthening.

3. The system of claim 1, wherein the chemically strengthened glass is formed by a method comprising immersion of the prior glass in a mixed potassium and sodium ion salt bath, containing less than 50 mole % sodium salt, at a temperature ranging from 450° C. to below an annealing point temperature.

4. The system of claim 1, wherein the back region consists of a single layer.

5. The system of claim 1, wherein the chemically strengthened glass is characterized by having a compressive stress of at least 30,000 psi at 50 microns below a surface of the glass.

6. The system of claim 1, wherein the chemically strengthened glass has a compression case depth of at least 1000 microns.

7. The system of claim 1, wherein the front region includes a polymeric layer.

8. The system of claim 1, wherein the impact projectile is a bullet.

9. The system of claim 1, wherein the impact projectile is a four pound gel mass.

10. A method for making a system, comprising:
fabricating a plurality of layers through bonding them together to form a system including a front region comprising at least one layer;
wherein the front region comprises a mass of material characterized by having sufficient energy absorption properties to reduce stresses caused by an impact,
wherein the impact has an impact energy of an impact projectile hitting the front region, and
a back region comprising at least one layer including a chemically strengthened glass characterized by having
a surface compression of at least 100,000 psi and
a compression case depth of at least 600 microns.

11. A method for using a system, comprising:
installing the system as a component in an article of manufacture, the system including a front region comprising at least one layer
wherein the front region comprises a mass of material characterized by having sufficient energy absorption properties to reduce stresses caused by an impact, wherein the impact has an impact energy of an impact projectile hitting the front region; and
a back region comprising at least one layer including a chemically strengthened glass characterized by having a surface compression of at least 100,000 psi and a compression case depth of at least 600 microns.

* * * * *